United States Patent [19]

Steyer

[11] Patent Number: 4,864,819
[45] Date of Patent: Sep. 12, 1989

[54] EXHAUST SYSTEM INCLUDING PROTECTIVE ARRANGEMENTS

[75] Inventor: William Steyer, Topsfield, Mass.

[73] Assignee: General Electric Company, Lynn, Mass.

[21] Appl. No.: 740,665

[22] Filed: Jun. 3, 1985

[51] Int. Cl.$^4$ .............................................. F02K 1/38
[52] U.S. Cl. ...................................... 60/264; 60/39.5; 239/265.17
[58] Field of Search .............. 60/264, 262, 271, 39.5; 239/127.3, 265.17, 265.19

[56] References Cited

U.S. PATENT DOCUMENTS

| | | | |
|---|---|---|---|
| 2,376,331 | 5/1945 | Abrams | 89/36 |
| 3,030,005 | 4/1962 | Nabour et al. | 60/264 |
| 3,428,141 | 2/1969 | Forstner et al. | 180/54 |
| 3,504,644 | 4/1970 | Schibisch | 109/49.5 |
| 3,817,030 | 6/1974 | Renius et al. | |
| 3,921,906 | 11/1975 | Nye et al. | |
| 3,970,252 | 7/1976 | Smale et al. | 60/264 |
| 3,981,143 | 9/1976 | Ross et al. | |
| 3,981,448 | 9/1976 | Demogenes et al. | |
| 4,007,587 | 2/1977 | Banthin et al. | 60/271 |
| 4,099,375 | 7/1978 | Inglee | 60/39.5 |
| 4,186,817 | 2/1980 | Bauer | |
| 4,214,441 | 7/1980 | Mouritsen et al. | 60/264 |
| 4,215,537 | 8/1980 | Hurley | 60/264 |
| 4,295,332 | 10/1981 | Steyer | |
| 4,312,480 | 1/1982 | Miller | 60/264 |
| 4,316,721 | 2/1982 | Weiss et al. | 239/265.19 |
| 4,325,283 | 4/1982 | Bemiss | |
| 4,349,080 | 9/1982 | Brockmann | |
| 4,355,507 | 10/1982 | Coffey et al. | 60/264 |
| 4,463,653 | 8/1984 | Pusch et al. | 60/39.5 |
| 4,566,270 | 1/1986 | Ballard et al. | 60/264 |

FOREIGN PATENT DOCUMENTS 1128532 9/1968 United Kingdom.

Primary Examiner—Donald E. Stout
Attorney, Agent, or Firm—Francis L. Conte; Jerome C. Squillaro

[57] ABSTRACT

An exhaust system having a protective arrangement includes a plurality of spaced overlapping inclined armor plate blockers providing a ballistic shield over the entire exhaust area. A louvered grate is provided extending between the tops of the blockers to permit egress of gases from the engine but to block destructive elements from being thrown into the interior of an engine. Cooling air is supplied to the blockers and is caused to move along a path which carries it across the surfaces of the blockers so as to materially reduce the temperature of these surfaces. Further, this cooling air is directed not only over surfaces of the blockers which are directly visible externally of the vehicle, but also over a surface which, while not directly visible from the exterior of the vehicle, is a potential source of reflected heat which could be sensed exteriorly of the vehicle.

29 Claims, 2 Drawing Sheets

4,864,819

EXHAUST SYSTEM INCLUDING PROTECTIVE ARRANGEMENTS

BACKGROUND OF THE INVENTION

1. Field of the Invention

This invention relates to an exhaust system including protective arrangements used with combat vehicles and more particularly to such an exhaust system incorporating both ballistic protection and cooling for minimizing the infrared (IR) signature of such vehicles.

2. Description of the Prior Art

Combat vehicles, such as tanks, require a suitable motive power plant for propelling the vehicle over terrain encountered in warfare. Some vehicles in present day use are powered by gas turbine engines which operate at very high temperatures, and the exhaust therefrom, therefore, is also at a very high temperature. Since an exhaust system must necessarily be provided for discharging the gases from the engine to the atmosphere, this exhaust system constitutes a potentially vulnerable area in the vehicle which must be heavily armored.

The exhaust area provides a potential entry area for a shell or missile or other destructive weapon projectiles fired or thrown at the combat vehicle. If the vehicle is to effectively serve its purpose, protection must be provided against the passage of such projectiles through the exhaust area to vital elements internally of the combat vehicle.

One element of such protection for the vehicle is suitable ballistic protection, that is protection against penetration by a shell or missile or other weapon projectile. Secondly, particularly because the gas turbines employed operate, as indicated above, at very high temperatures it is necessary to provide for a reduction of temperature of components in the exhaust area and exhaust gases so as to reduce what is generally referred to as the infrared (IR) signature, that is in an area of high temperature, which can be sensed by various types of IR detectors and IR seeking weapons used against such combat vehicles. For example, heat-seeking missiles can sense the high temperature of the exhaust area and "lock" onto this area so that the missile is guided directly to the exhaust system and potentially into vulnerable vital areas of the combat vehicle with resultant damage thereto.

The prior art discloses combat vehicles which are provided with ballistic protection in the form of armor plate to protect a vital area of a vehicle, for example a radiator. Such armor plate may be in a form of inclined panels of suitable material which provide a shield for the vulnerable part and still permit ingress of cooling air.

The prior art also discloses a variety of arrangements for providing infrared radiation suppression, that is various arrangements for cooling the externally visible surfaces and exhaust gases so as to reduce the temperature thereof and thereby reduce the IR signature. These include arrangements for cooling externally visible surfaces and arrangements for positioning cooler components so as to block an external line of sight to hotter components inwardly thereof.

The present invention, however provides in a very compact form an arrangement which both provides protection against ballistic damage to the vehicle and materially reduces the temperature of the elements of the exhaust system and exhaust gases visible from the exterior of the vehicle so as to reduce the IR signature and thereby minimize the risk of detection or damage to the vehicle by heat-seeking missiles or similar devices.

Accordingly, it is an object of this invention to provide an exhaust system including an integrated protective arrangement which both provides ballistic protection and also reduces IR signature so as to minimize detection or vulnerability to heat-seeking weapons.

It is another object of this invention to reduce the temperature both of surfaces which are directly visible externally of the vehicle and also of surfaces which are not in direct line of sight externally of the vehicle but which nevertheless could provide reflected heat serving as an IR signature.

SUMMARY OF THE INVENTION

In one embodiment of the invention a plurality of spaced overlapping armor plate components or blockers are provided at an outlet end of an exhaust system for providing a ballistic shield over the entire exhaust area. In a preferred embodiment of the invention, a plurality of overlapping inclined vanes are provided also at an inlet end of the exhaust system for directing exhaust gases from the engine into the exhaust system. The blockers are inclined opposite to the inclination of the vanes so that the vanes and blockers cause the exhaust gases to follow in a serpentine flowpath. A louvered grate may be provided to extend between the tops of the blockers to permit egress of gases from the engine but to block weapon projectiles such as grenades, from being thrown therepast. To reduce the infrared signature, means for supplying cooling air to the blockers is provided.

DESCRIPTION OF THE DRAWINGS

This invention will be more readily understood from the following description of the preferred embodiment in connection with the accompanying drawings in which.

DESCRIPTION OF THE PREFERRED EMBODIMENT

Figure 1:
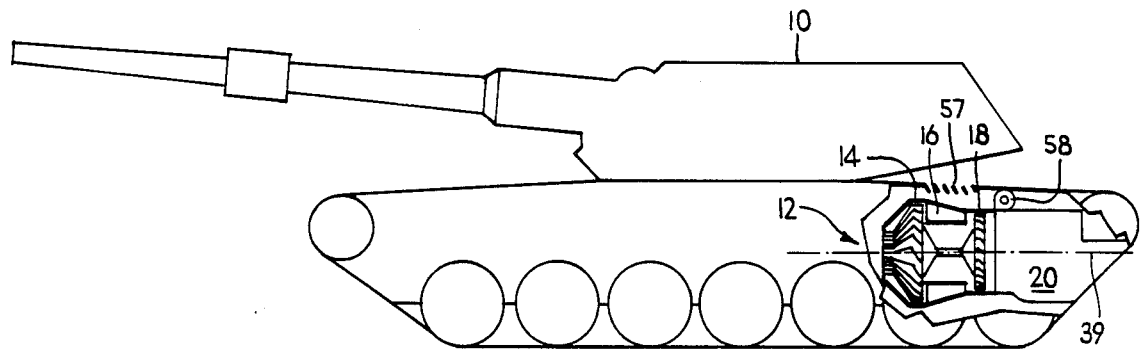
FIG. 1 is a side view of a tank partly broken away to show a schematic gas turbine engine and an exhaust system therefor in accordance with one embodiment of the invention.

Illustrated in FIG. 1 is a conventional tank 10 having a gas turbine engine 12 power plant. The engine 12 includes a compressor 14, combustor 16 and turbine 18, all conventional. A conventional recuperator (not shown) may also be used in the engine 12. Exhaust gases are discharged from the turbine 18, and through the recuperator, if used, to an exhaust system 20 in accordance with one embodiment of the present invention.

Figure 2:
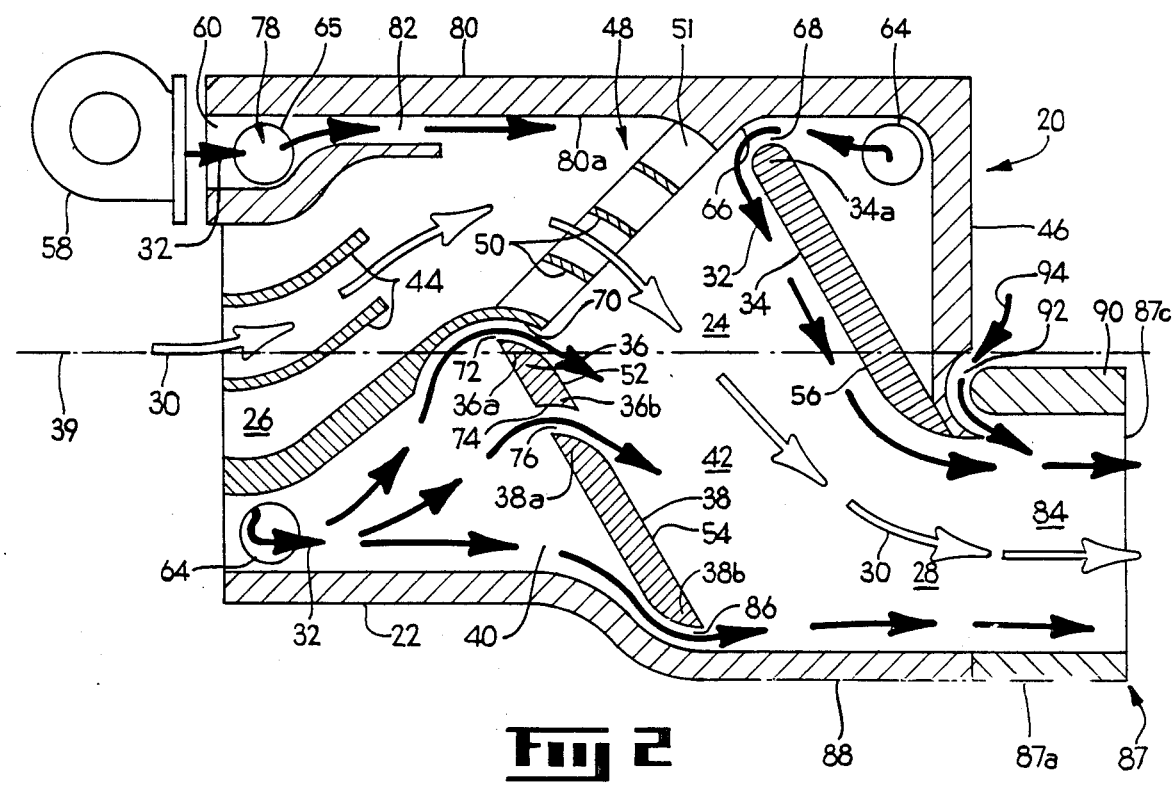
FIG. 2 is a partly schematic sectional illustration of one embodiment of the invention showing flow of cooling air and exhaust gases therethrough.
Figure 3:
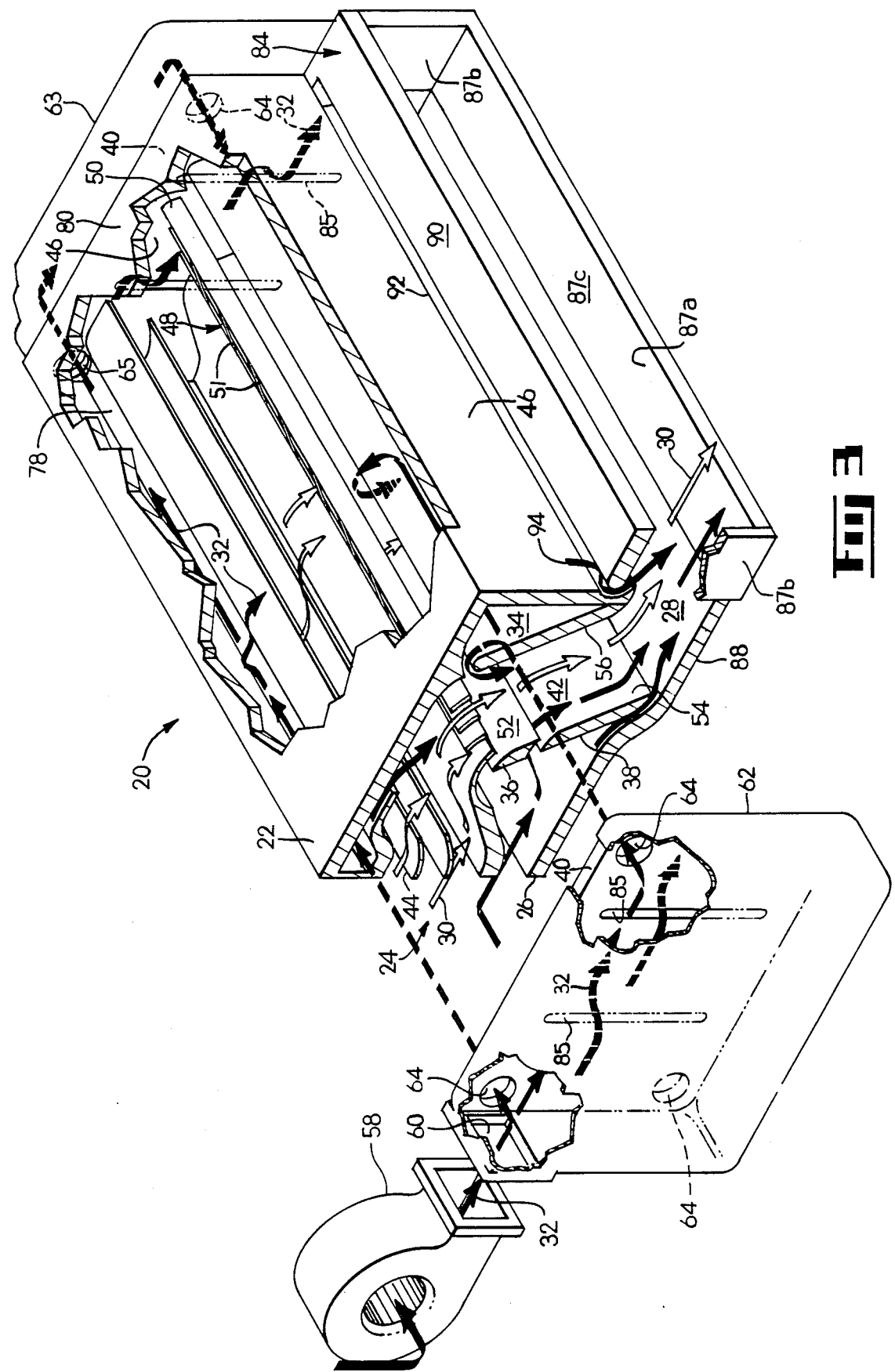
FIG. 3 is an isometric view, partly broken away to show internal components, of the exhaust system of FIGS. 1 and 2.

As illustrated in FIGS. 2 and 3, the exhaust system 20, and the protective arrangement thereof, includes a housing 22 forming a generally rectangular duct 24 having an inlet end 26 and an outlet end 28. The inlet end 26 is adapted to be connected to the exhaust end of the gas turbine engine 12 for receiving exhaust gases from the turbine 18 thereof. In one embodiment of the invention the duct inlet end 26 may be connected to the recuperator (not shown) interposed between the turbine 18 of the engine 12 and the duct 24 rather than being connected directly to the turbine 18.

The exhaust system 20 is primarily intended to be utilized with a vehicle such as a tank and is intended to provide two-fold protection for such a vehicle. The exhaust system 20 incorporates blocker members positioned so as to minimize the risk of shells or other ballistic weapon projectiles penetrating into the vital areas of the engine 12. Further, it is intended to minimize infrared (IR) radiation to exterior areas of the vehicle where it can be sensed by IR detection equipment, or heat-seeking missiles or similar destructive weapons. It will be appreciated that such a protective arrangement could be utilized in other environments, for example with helicopters or aircraft where weight limitations permit.

Accordingly, while the term "vehicle" has been employed in the specification for a specific description of the operation and function of the exhaust system 20 it is intended, as used in the specification and claims, to include both applications where the exhaust system 20 is applied to land vehicle where it is particularly useful and also where it may be applied to apparatus such as helicopters and airplanes.

For convenience in describing the construction and operation of the exhaust system 20, the flow of hot exhaust gases 30 through the duct 24 is indicated in the accompanying drawing by unshaded arrows 30 and the flow of cooling gases 32 through the duct 24 is indicated by shaded arrows 32.

A plurality of elongated, laterally spaced generally rectangular blocker members are formed of a suitable armor plate material, e.g., steel, to provide ballistic protection. Although two are sufficient, three blocker members 34, 36, and 38 are preferred and are suitably fixedly attached and extend between opposing sides 40 (see FIG. 3) in the duct outlet end 28. These blockers are inclined in a first direction downwardly and rearwardly with respect to a longitudinal axis 39 of the duct 24 and provide a channel 42 therebetween for flow of the hot exhaust gases 30.

A plurality of elongated, laterally spaced and aligned curved vanes 44 are suitably fixedly attached and extend between the opposing sides 40 within the duct inlet end 26. These vanes 44 are inclined in a second direction, opposite to the first direction, upwardly and rearwardly with respect to the longitudinal axis 39 of the duct 24 to direct the hot exhaust gases 30 upwardly and rearwardly as indicated in FIG. 2.

The vanes 44 overlap each other to block line-of-sight viewing parallel to the longitudinal axis 39 but are laterally spaced to allow substantially unobstructed flow of the exhaust gases 30 therebetween. The vanes 44 are formed of suitable armor plate material, e.g., steel, so as to provide protection against ballistic weapon projectiles over the inlet end 26 cross-sectional area of the duct 24 over which the vanes 44 extend.

The combination of the upwardly inclined vanes 44 and the downwardly inclined blocker members 34, 36, 38, results in the hot exhaust gases 30 being channeled in a serpentine flowpath through the duct 24.

In order to provide comprehensive ballistic protection against shell, missiles, or other weapon projectiles delivered from outside the vehicle toward the exhaust system 20 blocker members 34, 36, 38 are made of suitable armor plate material and are arranged, as shown in FIGS. 2 and 3, so as to collectively extend across substantially the entire cross-sectional area of the duct 24 blocking direct line-of-sight therein parallel to the longitudinal axis. Specifically, the blocker members 36 and 38 are arranged to extend from the bottom of the duct 24 upwardly to a point at least above the center, indicated by the longitudinal axis, of the duct 24.

The first blocker member 34 overlaps the entire second blocker member 36 and partially overlaps the third blocker member 38, so as to provide the aforementioned ballistic protection across the entire cross-sectional area of the duct 24. Thus any shell or missile entering the duct 24 from the direction of the outlet end 28 is blocked from reaching any vital engine parts by the blocker members 34, 36, 38. This ballistic protection is supplemented over a center portion of the cross-sectional area of the duct 24 by the vanes 44 which, as indicated above, are also made of armor plate material.

The housing 22 further includes a rearwardly facing end wall or panel 46 at the upper rear end thereof above the duct outlet end 28 and is generally disposed coextensively with the first blocker member 34. The panel 46 is formed of suitable armor plate material, e.g., steel, and further supplements the ballistic protection provided for upstream directed weapon projectiles. Of course, all of the walls forming the housing 22 may be formed of suitable armor plate material.

In order to provide still further protection for the engine 12 a louvered grate 48 having a plurality of elongated, laterally spaced louvers 50 is suitably arranged to extend between the duct sides 40 and between upstream ends 34a, 36a of the blocker members 34 and 36. Extending perpendicularly between the louvres 50 is a plurality of spaced cross members 51 which create a checkerboard type grate 48. The members 51 provide increased mechanical rigidity to the grate 48 and additional protection from projectiles.

More specifically, the grate 48 is sized to provide passages between the louvers 50 and cross members 51 for allowing the exhaust gases 30 to flow therethrough while precluding the entry of weapon projectiles, for example, grenades, which might otherwise be projected or placed upstream into the exhaust system 20 for reaching vital engine parts.

It will be understood that the hot exhaust gases 30 flowing in the duct 24 will heat the blocker members 34, 36, and 38. It can be seen by reference to FIGS. 2 and 3 that the lower, third blocker member 38 and, to some extent, the second blocker member 36 are positioned so that infrared radiation from inner surfaces 52 and 54 thereof, respectively, is directed through the outlet end 28 to the exterior of the vehicle. This infrared radiation, sometimes referred to as the infrared signature, is of course, "visible" to IR detectors, or heat-seeking weapons, such as shells or missiles equipped with heat sensors, which can cause them to "lock onto" such infrared signature areas.

Similarly, a heated inner surface 56 of the upper, first blocker member 34, while not positioned so as to direct infrared radiation therefrom directly through the outlet end 28 to the exterior of the vehicle, is positioned so that such infrared radiation may be reflected by the lower block member 38 to the exterior of the vehicle through the exhaust system outlet end 28.

In accordance with other features of the invention means for reducing infrared signature are provided. These means include the serpentine flowpath above described which blocks direct line-of-sight of hot parts in the engine 12.

The means for reducing IR signature also includes means for cooling the blocker members 34, 36, and 38. Cooling air 32 is preferably obtained from a filtered air inlet 57 (See FIG. 1) suitably disposed in the surface of the tank 10 for receiving ambient air. The inlet 57 primarily provides filtered inlet air for the engine 12, and secondarily is used to provide the cooling air 32. The cooling air 32 is suitably provided to the exhaust system 20 at above atmospheric pressure by means of a conventional blower, or fan, 58 disposed in suitable flow communication with the air inlet 57. The blower 58 is disposed also in flow communication with a cooling air inlet 60 disposed in an upstream wall of the housing 22.

Furthermore, the cooling air 32 may be supplemented by air scavenged from a conventional, and optional, inlet particle separator (not shown) of the engine 12. Accordingly, any available cooling air source may be utilized, and may provide, for example, clean air from the inlet 57 or relatively dirty air from the separator.

The housing 22 includes at least one manifold 62 which extends along a side 40 of the duct 24 and which includes the cooling air inlet 60. Outlet openings 64 are provided in the manifold 62 for directing the cooling air 32 over the various parts to be cooled as described hereinbelow. Thus, cooling air 32 supplied from the blower 58 is directed through the outlet openings 64 from the manifold 62, as indicated in FIGS. 2 and 3 by the shaded arrows. The cooling air 32 is thus suitably ducted from the manifold 62 in the housing 22 to flow against and over the blocker members 34, 36, 38 for film and convection cooling thereof.

In order to reduce the temperature of the inner surfaces 52, 54, 56, means for reducing the infrared radiation emitted from the vehicle are provided in accordance with the invention, and include means for effectively reducing the temperature of these surfaces by film cooling. This correspondingly reduces the risk of detection or of a heat-sensing weapon being directed into the exhaust system 20 and thereby supplements the protection provided by the blocker members 34, 36, 38.

To accomplish this result with respect to the first blocker member 34, a portion of the housing 22 adjacent the upstream end 34a of the blocker member 34 is configured as a first turning wall 66 spaced from the upstream end 34a. Similarly, the upstream end 34a, itself, is similarly curved so as to provide between the wall 66 and end 34a a first arcuate passage 68 which channels cooling air 32 from manifold outlet 64 therethrough to be directed generally along the inner surface 56 of blocker member 34 for film cooling thereof.

The arcuate passage 68 does not positively direct the cooling air 32 precisely along the inner surface 56, but rather sufficiently close thereto that other physical forces, such as the Coanda effect, cause the cooling air 32 to flow along the surface, providing, in effect, film cooling thereof.

To accomplish this result with respect to the upper, second, blocker member 36 of the pair of blocker member 36, 38 illustrated in FIG. 2, a plate, or second turning wall 70, which provides support for one end of the grate 48, is curved as shown in FIG. 2. The upstream end 36a of the second blocker member 36 is similarly curved, as shown, to provide between the curved surfaces 70, 36a, a second arcuate passage 72 through which the cooling air 32 is directed from the manifold 62 toward the inner surface 52 of the blocker member 36.

In order to direct cooling air 32 along the inner surface 54 of blocker member 38 a downstream end 36b of second blocker member 36 is suitably curved to define a third turning wall 74 and the upstream end 38a of the third blocker member 38 is curved to provide a third arcuate passage 76 therebetween. Cooling air 32 channeled from the manifold 62 through the third arcuate passage 76 is thereby directed generally along the inner surface 54 of the third blocker member 38.

As is the case of first blocker member 34, the curvature of the arcuate passages 72, 76 does not positively direct the cooling air 32 precisely along the surfaces 52, 54, but sufficiently close thereto that other physical effects cause the cooling air 32 to flow predominantly along the surfaces 54, 54 to provide film cooling thereof.

Thus by the specific arrangement of the plurality of spaced inclined blocker members 34, 36, 38 and the arrangement thereof with adjacent structures to direct cooling air 32 in a particular manner thereof, both desirable results of the protective arrangement are achieved. Specifically, the blocker members 34, 36, 38 provide ballistic protection against entry of shells, missiles or other weapons into the vital engine areas, and the arrangement for directing cooling air 32 over the blocker members 34, 36, 38, reduces infrared radiation therefrom and thereby reduces the risk of detection or of heat-sensing shells or missiles locking onto the infrared signature.

The means for reducing IR signature preferably further includes a plenum 78 disposed in a top sidewall 80 of the housing 22 spaced upstream from the upstream blocker member ends 34a, 36a and the grate 48. The plenum 78 is in flow communication with one of the manifold outlet openings 64 and includes a slot 82 configured for channeling air in film cooling along an inner surface 80a of sidewall 80 and then through the grate 48 toward the first blocker member 34 for mixing with the exhaust gases 30 to reduce the temperature thereof. Of course, the cooling air 32 channeled through the arcuate passages 68, 72, 76 also mixes with the exhaust gases 30 to reduce the temperatures thereof.

Preferably, the housing 22 includes a pair of manifolds 62 and 63 located on both sides 40 of the duct 24. Each manifold 62, 63 may be provided separately with suitable cooling air 32 or, as shown in FIG. 3, cooling air 32 may flow longitudinally through the plenum 78 between corresponding openings 64 and 65 in the pair of manifolds 62, 63. In this way, one manifold 62 provides cooling air 32 through one of its outlet openings 64 to the inlet opening 65 of the other manifold 63. Air from the inlet opening 65 is then channeled to the outlet openings 64 within the second manifold 63.

The means for reducing IR signature may also include a plurality of spaced gill slots 85 disposed in both sides 40 and extending in a vertical direction. Respective gill slots 85 are in flow communication with the manifolds 62 and 63 and channel cooling air 32 therefrom into the duct 24 for providing film cooling of the inner surfaces of the sides 40, thereby reducing their temperature and IR signature.

To further increase the effectiveness of protection for the vehicle and to provide additional IR signature reduction, channelling means 84 is provided in flow communication with the outlet end 28 of the exhaust duct 24. The channelling means 84 extends from the duct 24 in a substantially horizontal direction and thereby is effective to channel exhaust gases 30 in a generally horizontal direction substantially parallel to the longitudinal axis 39 of the duct 24 and the ground. By employing this channeling means 84, therefore, the exhaust gases 30 are prevented from being directed downwardly to heat up the ground or kick up dust therefrom, which would provide a detectable signature to be avoided.

More specifically, the channelling means 84 includes a generally U-shaped member 87 having a flat base member 87a suitably fixedly attached to bottom sidewall 88 of the duct 24 and extending rearwardly therefrom substantially parallel to the longitudinal axis 39. The base member 87a extends the full width of the outlet end 28 and has suitably fixedly attached at opposite ends thereof a pair of side members 87b extending perpendicularly upwardly therefrom. The side members 87b are also suitably fixedly attached to respective sides 40 of the duct 24. The member 87 has an outlet opening 87c at its downstream end.

The member 87 is effective for channelling the exhaust gases 30 from the duct outlet end 28 and through the outlet opening 87c in a rearward direction substantially parallel to the longitudinal axis 39. The side members 87b block the gases 30 from spilling over the side edges of the base member 87a. Accordingly, the ability of the exhaust gases 30 to directly impinge upon the ground is reduced.

Inasmuch as the exhaust gases are channeled through the duct outlet end 28 in a downwardly direction against the base member 87a, a vena contracta will form just downstream of the duct outlet end 28 which will create a back pressure in the exhaust gases 30 in the duct 24. Back pressure is undesirable in most situations because it will reduce the efficiency of the engine 12.

Accordingly, to reduce the back pressure, the channelling means 84 preferably further includes a top member 90 spaced parallel to the base member and extending outwardly from the end wall 46. The top member 90 is suitably fixedly joined to the side members 87b so that the outlet opening 87c is generally rectangular in cross-section. The top member 90 is generally aligned with the top edge of the outlet end 28 so that the cross sectional flow area of the channeling means 84 is generally at least as large as the cross sectional flow area of the outlet end 28. The specific flow area of the means 84 is, of course, a matter of design which can be conventionally determined by those skilled in the art familiar, for example, with fluid mechanics including the concept of vena contracta, from the teachings herein.

The top member 90 provides a surface to which the exhaust gases 30 can attach, thusly providing an increased flow area as compared to that flow area which would otherwise be formed without the top member 90. The channelling means 84 so structured thus provides for diffusion of the exhaust gases 30 to reduce back pressure and, thereby, allowing for increased engine efficiency.

In order to cool the surfaces of the channelling means 84 two sources of cooling air are provided. First, the cooling air 32 from the manifold 62 is caused to flow through a passage 86 defined between a bottom, downstream end 38b of the blocker member 38 and the first bottom sidewall 88. Such cooling air 32 is thereby directed along the inner surfaces of the first sidewall 88 and the base member 87a to cool these surfaces and minimize infrared radiation therefrom.

The second source of air is provided by spacing the top member 90 from the duct end wall 46 to form an ejector opening 92 therebetween for entry of ambient air 94. Further, the end wall 46 is curved at its lower end and the adjacent portion of the top member 90 is correspondingly curved to provide the opening 92 with an arcuate shape for directing the ambient air 94 generally along the inner surface of the top member 90 for cooling thereof. Furthermore, the ambient air will mix with the exhaust gases 30 to reduce the temperature thereof and further reduce IR signature.

Inasmuch as the blocker member 34, 36, 38 are effectively cooled and block the line-of-sight to the vanes 44, cooling of the vanes is not necessary.

From the foregoing description it will be apparent that the invention provides an improved protective arrangement in the exhaust system 20 of a gas turbine engine, particularly as applied to a land vehicle, which accomplishes multiple beneficial results. The protective arrangement shown reduces infrared radiation from the exhaust system 20 components to the exterior of the vehicle and thereby reduces the opportunity for heat-sensing weapons to detect the heated exhaust area and correspondingly reduces the possibility of damage to the engine from such weapons. Further, the protective arrangement incorporates components arranged in a manner which provides ballistic protection across substantially the entire cross-sectional area of the exhaust duct 24 so as to minimize the risk of damage from shells or missiles which may strike this area. Further, the construction prevents objects thrown into the exhaust system 20 from reaching vital engine parts.

While specific embodiments of the invention have been shown and described it is intended by the appended claims to cover not only the specific embodiments but such alternative embodiments as come within the spirit and scope of these claims. For example, the second and third blocker members 36, 38 need not be aligned but may be axially spaced and partially overlap to provide for more effective film cooling of member 38 and to increase ballistic protection by providing two barriers to a projectile.

Although, terms such as top, bottom, downwardly and upwardly, etc. have been used to describe the preferred embodiment of the invention, they are not intended to be limiting, and embodiments having other related positions fall within the scope of the invention.

Having thus described the preferred embodiments of the invention, what is claimed to be secured by Letters Patent to the United States is:

1. An exhaust system having a protective arrangement for a gas turbine engine mounted in a vehicle comprising:
   duct means having an inlet end for receiving hot exhaust gases from the engine and an outlet end for discharging gases therefrom;
   a plurality of laterally spaced armor plate blocker members disposed in said duct means, said blocker members being inclined relative to a longitudinal axis of said duct means and adjacent ones of said blocker members overlapping each other to block line-of-sight viewing parallel to said longitudinal axis for providing a ballistic shield across the cross-sectional area of said duct means, said blocker members being effective for channeling exhaust gases therebetween;
   means for supplying cooling air to said blocker members; and means for directing the cooling air along inner surfaces of said blocker members to cool said surfaces and reduce infrared radiation therefrom to the exterior of the vehicle.

2. An exhaust system according to claim 1 wherein said means for directing cooling air along the surfaces includes a curved member positioned near the top of each of said blocker members and spaced therefrom to provide a passage for directing the cooling air in a direction generally parallel to said surfaces to provide film cooling thereof.

3. An exhaust system according to claim 1 wherein said plurality of blocker members include a first pair of blocker members disposed in a lower portion of said duct means and including a surface positioned so that infrared radiation therefrom is directed exteriorly of the vehicle, said first pair of blocker members each having an upstream end being shaped to direct cooling air over said surface to reduce infrared radiation therefrom, said plurality of blocker members also including a third blocker member disposed in an upper portion of said duct means and overlapping said pair of blocker members to block line-of-sight viewing parallel to said longitudinal axis for providing a complete ballistic shield across the entire cross-sectional area of said duct means, a surface of said third blocker member being so disposed that infrared radiation reflects from said pair of blocker members and may pass exteriorly of the vehicle, said cooling air being directed over said surface of said third blocker member to reduce such radiation.

4. An exhaust system according to claim 1 wherein a grate extends between upper ends of said spaced blocker members to block passage of any objects thrown into the space between said blocker members.

5. An exhaust system according to claim 4 wherein:
said plurality of spaced blocker members are disposed near the outlet end of said duct means; and
a plurality of spaced vanes are disposed near an inlet end of said duct means;
said vanes being inclined oppositely to the inclination of said plurality of blocker members whereby exhaust gases follow a serpentine path through said duct means, passing over said vanes, through said grate and over said blocker members; and
said vanes extending partially across the cross-sectional area of said duct means and adjacent ones of said vanes overlapping each other to block line-of-sight viewing parallel to said longitudinal aixs, and said vanes being formed of armor plate to provide additional ballistic protection.

6. An exhaust system according to claim 1 further including channelling means extending generally horizontally from said outlet end of said first-mentioned duct means for discharging gases substantially horizontally to minimize dust and heating of the ground resulting from discharge of the gases.

7. An exhaust system according to claim 6 wherein said channelling means includes a generally U-shaped member having a base member extending the full width of said duct outlet end and a pair of side members extending perpendicularly from opposite ends of said base member.

8. An exhaust system according to claim 7 wherein said channelling means further includes a top member spaced parallel to said base member and joined to said side members to define a cross sectional flow area at least as large as a cross sectional flow area of said duct outlet end.

9. An exhaust system according to claim 8 wherein said top member is spaced in a downstream direction from said duct outlet end to define an ejector opening for allowing entry of cooling air into said channelling means.

10. An exhaust system for an engine comprising:
a duct having an inlet end for receiving exhaust gases from the engine and an outlet end for discharging said exhaust gases;
a plurality of armor plate blocker members at said outlet end in said duct and being inclined in a first direction relative to a longitudinal axis of said duct and laterally spaced adjacent ones of said blocker members overlapping each other to block line-of-sight viewing parallel to said longitudinal axis for providing a ballistic shield across the cross-sectional area of said duct, said blocker members being laterally spaced for channeling said exhaust gases therebetween from said inlet end to said outlet end; and
a plurality of laterally spaced vanes at said inlet end in said duct and being inclined in a second direction, opposite to said first direction, for channeling said exhaust gases in a serpentine flowpath through said vanes and said blocker members, and adjacent ones of said vanes overlapping each other to block line-of-sight viewing parallel to said longitudinal axis.

11. An exhaust system according to claim 10 further comprising a grate disposed over upstream ends of said blocker members effective for allowing said exhaust gases to flow therethrough and sized for preventing weapon projectiles from being placed upstream thereof.

12. An exhaust system according to claim 10 wherein said blocker members comprise first, second and third block members disposed at said outlet end in said duct and being inclined in a first direction to a longitudinal axis of said duct and said first blocker member being laterally spaced from and overlapping said second and third blocker members to block line-of-sight viewing parallel to said longitudinal axis for providing a ballistic shield across the cross-sectional area of said duct, said second and third blocker members being aligned with each other and laterally spaced from said first blocker member for channeling said gases therebetween from said inlet end to said outlet end.

13. An exhaust system according to claim 10 wherein said duct has a rearwardly facing end wall generally coexstensive with one of said blocker members and effective for providing additional ballistic protection to said duct against weapon projectiles directed toward said one blocker member from a downstream position.

14. An exhaust system according to claim 10 wherein said duct has walls of armor plate for providing ballistic protection.

15. An exhaust system according to claim 10 further comprising means for reducing IR signature.

16. An exhaust system according to claim 15 wherein said means for reducing IR signature comprises means for cooling said blocker members including means for channeling cooling air along inner surfaces of said blocker members for providing film cooling thereof.

17. An exhaust system according to claim 15 wherein said means for reducing IR signature comprises a first turning wall spaced from an upstream end of a first, downstream blocker member for turning cooling air to provide film cooling over an inner surface of said first blocker member.

18. An exhaust system according to claim 17 wherein said means for reducing IR signature further comprises second and third upstream blocked members, said second blocker member being spaced from a second turning wall so that cooling air is channeled therebetween for film cooling an inner surface of said second blocker member, and said second and third blocker members being spaced from each other to define a third turning wall therebetween for channeling cooling air for film cooling an inner surface of said third blocker member.

19. An exhaust system according to claim 17 wherein said means for reducing IR signature further comprises a plenum disposing in a sidewall of said duct spaced from upstream ends of said blocker members and configured for channeling cooling air in film cooling along an inner surface of said sidewall and toward said first blocker member inner surface for mixing with said exhaust gases to reduce the temperature thereof.

20. An exhaust system according to claim 15 wherein said means for reducing IR signature comprises channelling means disposed in flow communication with said duct outlet end effective for channeling exhaust gases from said duct in a direction substantially parallel to said longitudinal axis thereof.

21. An exhaust system according to claim 20 wherein said channelling means includes a generally U-shaped member having a base member extending the full width of said duct outlet end and a pair of side members extending perpendicularly from opposite ends of said base member.

22. An exhaust system according to claim 21 wherein said channelling means further includes a top member spaced parallel to said base member and joined to said side members to define a cross sectional flow area at least as large as a cross sectional flow area of said duct outlet end.

23. An exhaust system according to claim 22 wherein said top member is spaced in a downstream direction from said duct outlet end to define an ejector opening for allowing entry of cooling air into said channelling means.

24. An exhaust system according to claim 15 wherein said means for reducing IR signature includes gill slots disposed in sides of said duct between which said blocker members extend, said gill slots being effective for receiving and channelling cooling air along inner surfaces of said duct sides.

25. An exhaust system for a gas turbine engine comprising:
a duct having an inlet end for receiving exhaust gases and an outlet end for discharging said exhaust gases;
first, second and third overlapping blocker members disposed at said outlet end in said duct and being inclined in a first direction to a longitudinal axis of said duct for providing a ballistic shield across the cross-sectional area of said duct, said second and third blocker members being aligned with each other and laterally spaced from said first blocker member for channeling said exhaust gases therebetween from said inlet end to said outlet end;
a plurality of laterally spaced and overlapping vanes disposed at said inlet end in said duct and being inclined in a second direction, opposite to said first direction, for channeling said exhaust gases in a serpentine flowpath through said vanes and said blocker members;
a grate disposed over upstream ends of said first and second blocker members and being sized for allowing said exhaust gases to flow therethrough and sized for preventing weapon projectiles from being placed upstream thereof;
means for supplying cooling air; and
means for reducing IR signature comprising:
a first turning wall spaced from said upstream end of said first blocker member for turning cooling air to provide film cooling over an inner surface of said first blocker member;
said second and third blocker members being disposed upstream from said first blocker member, said second blocker member being spaced from a second turning wall so that cooling air is channeled therebetween for film cooling an inner surface of said second blocker member, and said second and third blocker members being spaced from each other to define a third turning wall therebetween for channeling cooling air for film cooling said third blocker member;
plenum means disposed in a sidewall of said duct spaced from said grate and configured for channeling cooling air in film cooling along an inner surface of said sidewall and toward said first blocker member inner surface for mixing with both said exhaust gases to reduce the temperature thereof; and
channelling means disposed in flow communication with said duct outlet end and being effective for channeling exhaust gases in a direction substantially parallel to said longitudinal axis.

26. An exhaust system according to claim 25 wherein said channelling means includes a generally U-shaped member having a base member extending the full width of said duct outlet end and a pair of side members extending perpendicularly from opposite ends of said base member.

27. An exhaust system according to claim 26 wherein said channelling means further includes a top member spaced parallel to said base member and joined to said side members to define a cross sectional flow area at least as large as a cross sectional flow area of said duct outlet end.

28. An exhaust system according to claim 27 wherein said top member is spaced in a downstream direction from said duct outlet end to define an ejector opening for allowing entry of cooling air into said channelling means.

29. An exhaust system according to claim 28 wherein said means for reducing IR signature includes gill slots disposed in sides of said duct between which said blocker members extend, said gill slots being effective for receiving and channelling cooling air along inner surfaces of said duct sides.

* * * * *